United States Patent
Yorifuji (10) Patent No.: US 11,458,893 B2
(45) Date of Patent: Oct. 4, 2022

(54) MONITORING DEVICE FOR VEHICLE AND MONITORING METHOD FOR VEHICLE

(71) Applicant: TOYOTA JIDOSHA KABUSHIKI KAISHA, Toyota (JP)

(72) Inventor: Yamato Yorifuji, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/363,584

(22) Filed: Jun. 30, 2021

(65) Prior Publication Data

US 2022/0041106 A1 Feb. 10, 2022

(30) Foreign Application Priority Data

Aug. 5, 2020 (JP) .............................. JP2020-133319

(51) Int. Cl.
| | |
|---|---|
| *B60R 1/00* | (2022.01) |
| *B60W 50/14* | (2020.01) |
| *G06V 20/58* | (2022.01) |

(52) U.S. Cl.
CPC ............. *B60R 1/002* (2013.01); *B60W 50/14* (2013.01); *G06V 20/58* (2022.01); *B60W 2050/146* (2013.01)

(58) Field of Classification Search
CPC .......... B60R 1/002; B60R 1/003; B60R 1/22; B60R 1/23; B60R 1/26; B60R 2300/105; B60R 2300/802; B60R 2300/8066
USPC ........................................................ 348/148
See application file for complete search history.

(56) References Cited

U.S. PATENT DOCUMENTS

| | | | |
|---|---|---|---|
| 7,568,716 B2 * | 8/2009 | Dietz ....................... | B60D 1/36 |
| | | | 348/148 |
| 2018/0186290 A1 * | 7/2018 | Ward ...................... | B60R 1/002 |
| 2022/0118910 A1 * | 4/2022 | Freeman-Powell .... | H04N 5/247 |

FOREIGN PATENT DOCUMENTS

JP           2013-90152 A     5/2013

* cited by examiner

*Primary Examiner* — Nathnael Aynalem (74) *Attorney, Agent, or Firm* — Sughrue Mion, PLLC (57) ABSTRACT

A monitoring device for a vehicle that, in a case in which it is determined, based on information captured by a towing information capture device, that the vehicle is not towing another vehicle, provides support for monitoring an area to a rear of the vehicle using images captured by a first capture device, and in a case in which it is determined, based on the information captured by the towing information capture device, that the vehicle is towing another vehicle, provides support for monitoring the area to the rear of the vehicle using images captured by a second capture device.

10 Claims, 7 Drawing Sheets

MONITORING DEVICE FOR VEHICLE AND MONITORING METHOD FOR VEHICLE

CROSS-REFERENCE TO RELATED APPLICATION

This application is based on and claims priority under 35 USC 119 from Japanese Patent Application No. 2020-133319 filed on Aug. 5, 2020, the disclosure of which is incorporated by reference herein.

BACKGROUND

Technical Field

The present disclosure relates to a monitoring device for a vehicle and a monitoring method for a vehicle.

Related Art

Technology relating to a vehicle periphery monitoring system that displays captured images of a vehicle periphery is disclosed in Japanese Unexamined Patent Application Laid-Open (JP-A) No. 2013-90152. In this related technology, the captured images of the vehicle periphery captured by an image capture element in a towed vehicle can be wirelessly transmitted to a towing vehicle, and the received captured images can be displayed on a display device in the towing vehicle.

However, in the above-described related technology, it is not possible for rear monitoring support to be provided in accordance with whether or not there is a towed vehicle, so that from this standpoint there is room for further improvement.

SUMMARY

An aspect of the present disclosure is a monitoring device for a vehicle that includes: a first capture device being installed in a rear end portion of a vehicle and capturing images of an area to a rear of the vehicle; a second capture device being installed in at least one of the vehicle or another vehicle in a case in which the vehicle is towing another vehicle, and that, in a case in which the vehicle is towing another vehicle, capturing images over a wider range of the area to the rear of the vehicle than does the first capture device; a towing information capture device capturing information relating to whether or not the vehicle is towing another vehicle; and a processor being configured to, in a case in which it is determined, based on the information captured by the towing information capture device, that the vehicle is not towing another vehicle, provide support for monitoring the area to the rear of the vehicle using images captured by the first capture device, and in a case in which it is determined, based on the information captured by the towing information capture device, that the vehicle is towing another vehicle, provide support for monitoring the area to the rear of the vehicle using images captured by the second capture device.

BRIEF DESCRIPTION OF DRAWINGS

Exemplary embodiments of the present disclosure will be described in detail based on the following figures, wherein.

DETAILED DESCRIPTION

Figure 2:
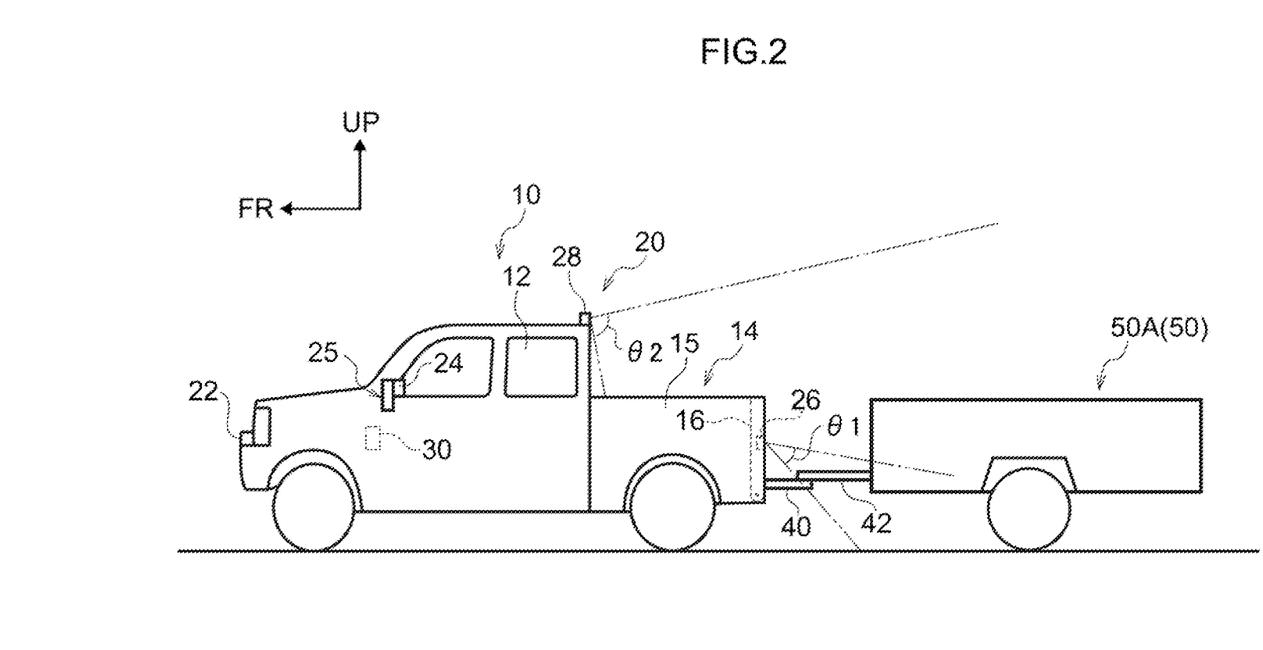
FIG. 2 is a view schematically showing an example of a state in which the vehicle shown in FIG. 1 is towing another vehicle having a low height.
Figure 3:
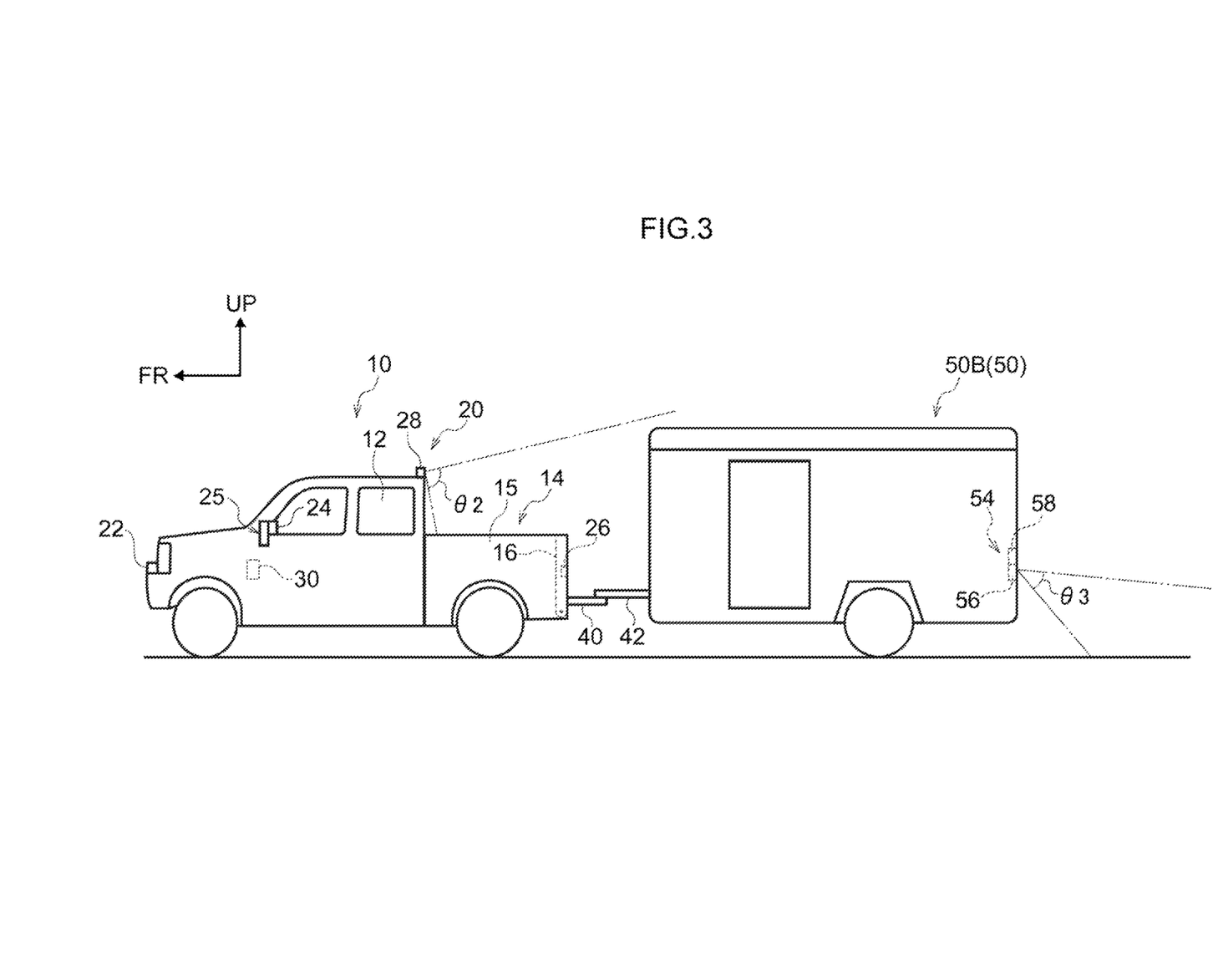
FIG. 3 is a view schematically showing an example of a state in which the vehicle shown in FIG. 1 is towing another vehicle having a high height.

A monitoring device for a vehicle according to an exemplary embodiment of the present disclosure will now be described using FIG. 1 through FIG. 7. Note that an arrow FR, and an arrow UP that are shown in FIG. 1 through FIG. 3 respectively indicate a vehicle forward direction and a vehicle upward direction.

Figure 1:
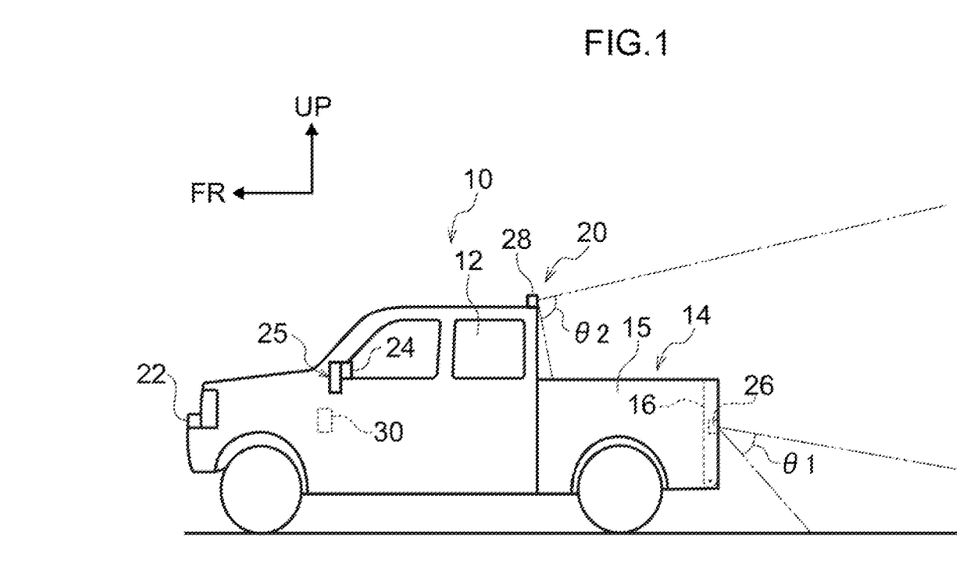
FIG. 1 is a view schematically showing a structural outline of a vehicle in which a monitoring device for a vehicle according to an exemplary embodiment has been installed.

A structural outline of a vehicle 10 in which a monitoring device for a vehicle 20 according to an exemplary embodiment has been installed is schematically shown in a vehicle side view in FIG. 1. The vehicle 10 has a CAN (Controller Area Network), and is constructed so as to be able to tow other vehicles. The monitoring device for a vehicle 20 is a device that monitors an area to the rear of this vehicle 10. As an example, the vehicle 10 is provided with a cargo tray 14 at a rear side of a vehicle cabin 12. A side panel 15 is provided at each side in a vehicle width direction of the cargo tray 14, and a tailgate 16 is provided at a rear end portion of the cargo tray 14.

A front camera 22 is provided at a front face portion of the vehicle 10. The front camera 22 is installed in a grill and captures images of an area to the front of the vehicle 10. Side cameras 24 are provided at side portions of the vehicle 10. The side cameras 24 are installed in outer mirror devices 25 and capture images of areas to the sides and to the rearward sides of the vehicle 10.

A first rear camera 26, which serves as a first capture device, is installed in a rear end portion of the vehicle 10. The first rear camera 26 is provided in a central portion in the vehicle width direction of the tailgate 16 and captures images of the area to the rear of the vehicle 10. In the drawings, an example of an angle of view of the first rear camera 26 is shown by θ1. A head camera 28, which serves as an upper camera and as a second capture device, is installed in the central portion in the vehicle width direction in an upper portion of the vehicle 10 on a rear-end portion side of the vehicle cabin 12. The head camera 28 captures images of the cargo tray 14 and of the area to the rear of the vehicle 10. In the drawings, an example of an angle of view of the head camera 28 is shown by θ2. In a case in which the vehicle 10 is towing another vehicle 50 (see FIG. 2), the head camera 28 installed in the vehicle 10 captures images of a wider range of the rear of the other vehicle 50 (see FIG. 2) than does the first rear camera 26.

Note that the front camera 22, the side cameras 24, the first rear camera 26, and the head camera 28 may be regarded as periphery monitoring cameras that are used to capture images (or video) of the periphery of the vehicle 10. Moreover, the first rear camera 26 and the head camera 28 may be regarded as rear monitoring cameras.

An example of a state in which the vehicle 10 is towing another vehicle 50A having a low vehicle height is schematically shown in a vehicle side view in FIG. 2. An example of a state in which the vehicle 10 is towing another vehicle 50B having a high vehicle height is schematically shown in a vehicle side view in FIG. 3. The other vehicle 50B shown in FIG. 3 is a trailer. Note that, in FIG. 2, the symbol 50A is used to indicate another vehicle whose vehicle height is lower than that of the vehicle 10, while in FIG. 3, the symbol 50B is used to indicate another vehicle whose vehicle height is higher than that of the vehicle 10, however, in the following description, in cases in which no distinction is being made between the other vehicle 50A and the other vehicle 50B, the term 'other vehicle 50' is used.

As is shown in FIG. 2 and FIG. 3, a connector 40 for towing is able to be attached to a lower portion of the rear-end side of the vehicle 10. Additionally, a connector 42 that connects to the connector 40 is attached to a lower portion of a front-end side of the other vehicle 50 that is being towed. Because known technology can be used for the connectors 40 and 42, no detailed drawings or detailed description thereof are given here.

As is shown in FIG. 3, a camera unit 54 is installed in a rear end portion of the other vehicle 50B having a high vehicle height. The camera unit 54 is formed so as to include a second rear camera 56, which serves as a rear portion camera for capturing images of the area to the rear of the other vehicle 50B (in a broader sense, of the area to the rear of the vehicle 10) and as a second capture device, and a communication device 58 that is used to transmit images captured by the second rear camera 56 to the vehicle 10. In the drawings, an example of an angle of view of the second rear camera 56 is shown by θ3. In a case in which the vehicle 10 is towing the other vehicle 50B, the second rear camera 56 installed in the other vehicle 56 captures images of a wider range of the rear of the other vehicle 50B than does the first rear camera 26.

Figure 4:
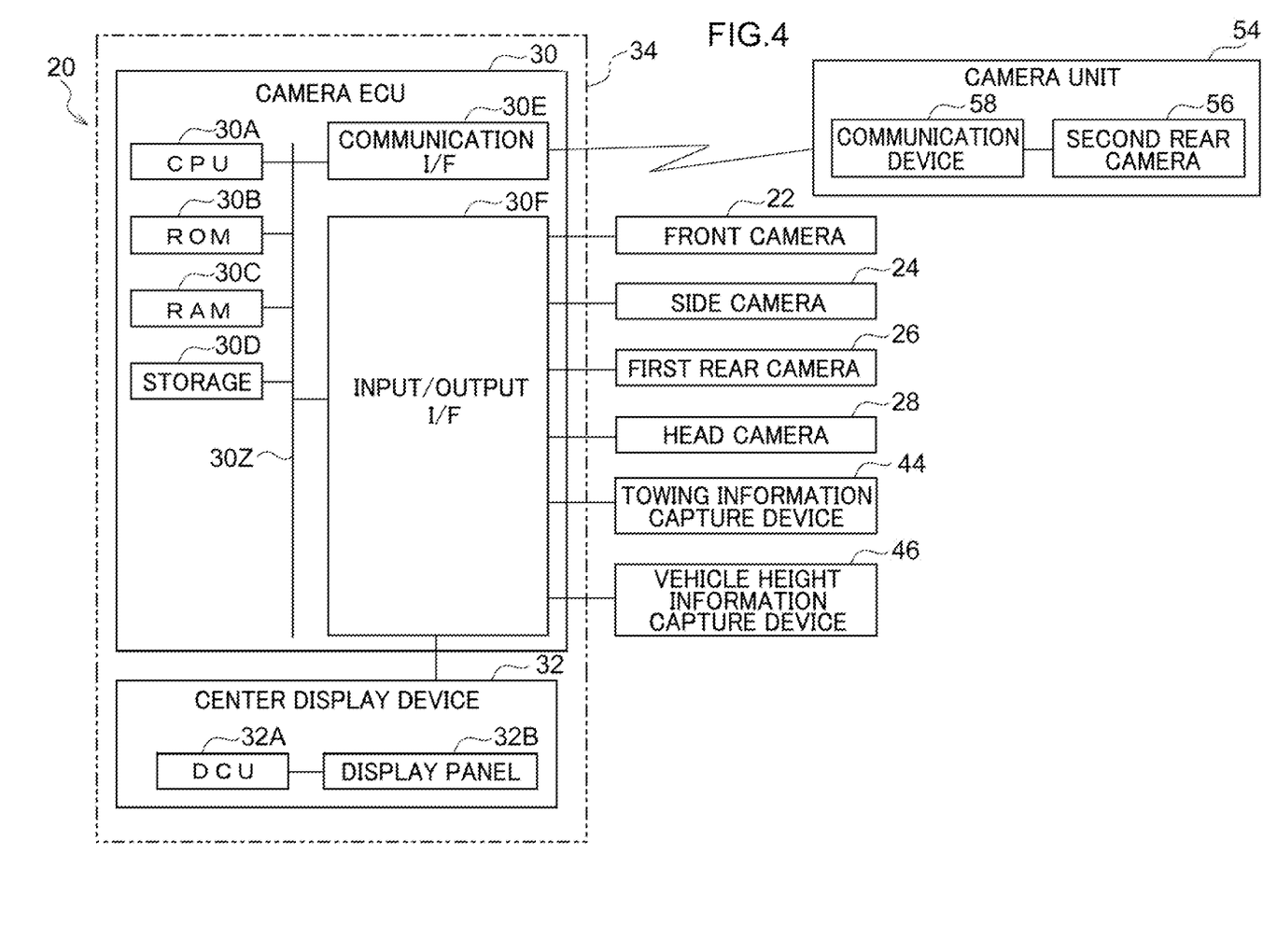
FIG. 4 is a block diagram showing an example of a hardware structure of the monitoring device for a vehicle which is in the state shown in FIG. 3.

An example of the hardware structure of the monitoring device for a vehicle 20 in the state shown in FIG. 3 is shown in a block diagram in FIG. 4.

As is shown in FIG. 4, the monitoring device for a vehicle 20 is provided with a camera ECU (Electronic Control Unit) 30 to which the above-described front camera 22, side cameras 24, first rear camera 26, and head camera 28 are connected. A detailed description of the camera ECU 30 will not be given here, other than to say that the camera ECU 30 is capable of combining images captured by the individual cameras. Additionally, a center display device 32, a towing information capture device 44, and a vehicle height information capture device 46 are also connected to the camera ECU 30.

The center display device 32 is provided with a DCU (Display Control Unit) 32A, which is an example of a hardware processor, and a display panel 32B, which serves as a presenter. The display panel 32B is provided in a central portion in the vehicle width direction of a front portion of the vehicle cabin interior 12 of the vehicle 10 and displays images (in other words, projects live video images). The DCU 32A has a function of switching the display shown on the display panel 32B back and forth between images (i.e., live video images) captured from the vehicle periphery, and information from a navigation system in accordance with touch operations made by a user on the display panel 32B. Because the navigation system is commonly known no detailed description thereof is given here.

The towing information capture device 44 captures information relating to whether or not the vehicle 10 is towing another vehicle 50. As an example, the towing information capture device 44 is formed so as to include a brake control ECU that is installed in the vehicle 10. This brake control ECU, which is an example of a hardware processor, is formed so as to output an ON signal in a case in which it is connected to an electromagnetic brake of the other vehicle 50, and to output an OFF signal in all other cases. Note that the towing information capture device 44 may also be formed so as to include a connection sensor that detects whether or not the vehicle 10 and the other vehicle 50 are connected to each other.

The vehicle height information capture device 46 captures vehicle height information for the other vehicle 50 (in other words, information about the height from the road surface on which the other vehicle 50 is standing to an upper end of the other vehicle 50) in a case in which the vehicle 10 is towing the other vehicle 50. As an example, the vehicle height information capture device 46 may be a device into which the vehicle height information for the other vehicle 50 to be towed is input in advance by a user, or may be able to perform image recognition on images captured by the head camera 28 and to thereby calculate the vehicle height information for the other vehicle 50.

The camera ECU 30 is formed so as to include a CPU (Central Processing Unit) 30A, which is an example of a hardware processor, ROM (Read Only Memory) 30B, RAM (Random Access Memory) 30C, and storage 30D, which are examples of memory, a communication I/F (Inter Face) 30E, and an input/output I/F 30F. The CPU 30A, ROM 30B, RAM 30C, storage 30D, communication I/F 30E, and input/output I/F 30F are connected via a bus 30Z so as to be able to mutually communicate with each other. The aforementioned DCU 32A is also provided with a CPU, ROM, RAM, storage, a communication I/F, and an input/output I/F, and these are also connected via a bus so as to be able to mutually communicate with each other.

The CPU 30A is a central processing unit, and performs tasks such as executing various types of programs, and controlling various units. In other words, the CPU 30A reads programs from the ROM 30B or from the storage 30D and executes these programs using the RAM 30C as a work area. The CPU 30A performs the aforementioned control of the various structures and various types of computation processing in accordance with the programs stored in the ROM 30B or the storage 30D. By loading and then executing the relevant programs, the CPU 30A is able to perform functions of a monitoring support unit, a display control unit, and a recording control unit. By loading and then executing the relevant programs, the CPU 30A is also able to perform functions of the towing information capture device and the vehicle height information capture device.

The ROM 30B stores various types of programs and various types of data. As an example, an image display control program that is employed in order to switch the image display in accordance with whether or not a vehicle being towed is present, and a recording control program that is employed in order to switch recordings in accordance with whether or not a vehicle being towed is present, and the like are stored in the ROM 30B. Furthermore, as an example, images captured by the first rear camera 26, the head camera 28, and the second rear camera 56, and the like are also recorded in the ROM 30B.

The RAM 30C serves as a work area and temporarily stores programs or data. The storage 30D is formed by a storage device such as an HDD (Hard Disk Drive) or an SSD (Solid State Drive), and stores various types of programs, and various types of data. The communication I/F 30E is an interface that the camera ECU 30 uses to perform communication with other devices such as a communication device 58 of the camera unit 54. A wireless communication Standard such as, for example, 4G, 5G, or Wi-Fi (Registered Trademark) or the like is used for this communication. Note that it is also possible for a cable-based communication Standard such as, for example, Ethernet (Registered Trademark) or FDDI or the like to be used for this communication.

The input/output I/F 30F is an interface that is employed to communicate with the various devices (including ECU other than the ECU 30) that are installed in the vehicle 10. As an example, the front camera 22, the side cameras 24, the first rear camera 26, the head camera 28, the towing information capture device 44, the vehicle height information capture device 46, and the center display device 32 are connected via the input/output I/F 30F to the camera ECU 30 of the present exemplary embodiment. Note that it is also possible for the front camera 22, the side cameras 24, the first rear camera 26, the head camera 28, the towing information capture device 44, the vehicle height information capture device 46, and the center display device 32 to be connected directly to the bus 30Z.

In the present exemplary embodiment, the camera ECU 30 and the center display device 32 form part of a monitoring support unit 34. In a case in which it is determined, based on information captured by the towing information capture device 44, that the vehicle 10 is not towing another vehicle 50, the monitoring support unit 34 provides monitoring support for monitoring the area to the rear of the vehicle 10 using images captured by the first rear camera 26. If, on the other hand, it is determined, based on information captured by the towing information capture device 44, that the vehicle 10 is towing another vehicle 50, the monitoring support unit 34 provides monitoring support for monitoring the area to the rear of the vehicle 10 using images captured by the head camera 28 or the second rear camera 56.

In addition, the monitoring support unit 34 provides this support for monitoring the area to the rear of the vehicle 10 by selecting one of the head camera 28 and the second rear camera 56 (which are serving as a plurality of second capture devices) in accordance with the vehicle height information for the other vehicle 50 captured by the vehicle height information capture device 46, and then using the images captured by the selected camera.

Figure 5:
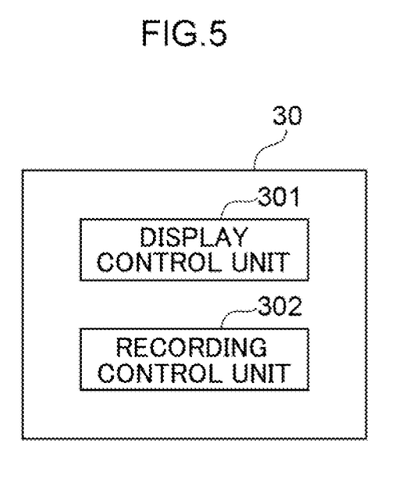
FIG. 5 is a block diagram showing an example of a function structure of a camera ECU of the monitoring device for a vehicle.

An example of a function structure of the camera ECU 30 is shown in a block diagram in FIG. 5. As is shown in FIG. 5, the camera ECU 30 has a display controller 301 and a recording controller 302 as function structures.

The display controller 301 is made to function by the CPU 30A reading the image display control program stored in the ROM 30B, and then executing this program. In a case in which it is determined, based on information captured by the towing information capture device 44, that the vehicle 10 is not towing another vehicle 50, the display controller 301 causes images captured by the first rear camera 26 to be displayed on the display panel 32B of the center display device 32. If, on the other hand, it is determined, based on information captured by the towing information capture device 44, that the vehicle 10 is towing another vehicle 50, the display controller 301 causes images captured by the head camera 28 or the second rear camera 56 to be displayed on the display panel 32B of the center display device 32.

The recording controller 302 is made to function by the CPU 30A reading the recording control program stored in the ROM 30B, and then executing this program. In a case in which it is determined, based on information captured by the towing information capture device 44, that the vehicle 10 is not towing another vehicle 50, the recording controller 302 causes images captured by the first rear camera 26 to be recorded in the ROM 30B. If, on the other hand, it is determined, based on information captured by the towing information capture device 44, that the vehicle 10 is towing another vehicle 50, the recording controller 302 causes images captured by the head camera 28 or the second rear camera 56 to be recorded in the ROM 30B.

Next, actions of the monitoring device for a vehicle 20 will be described.

Figure 6:
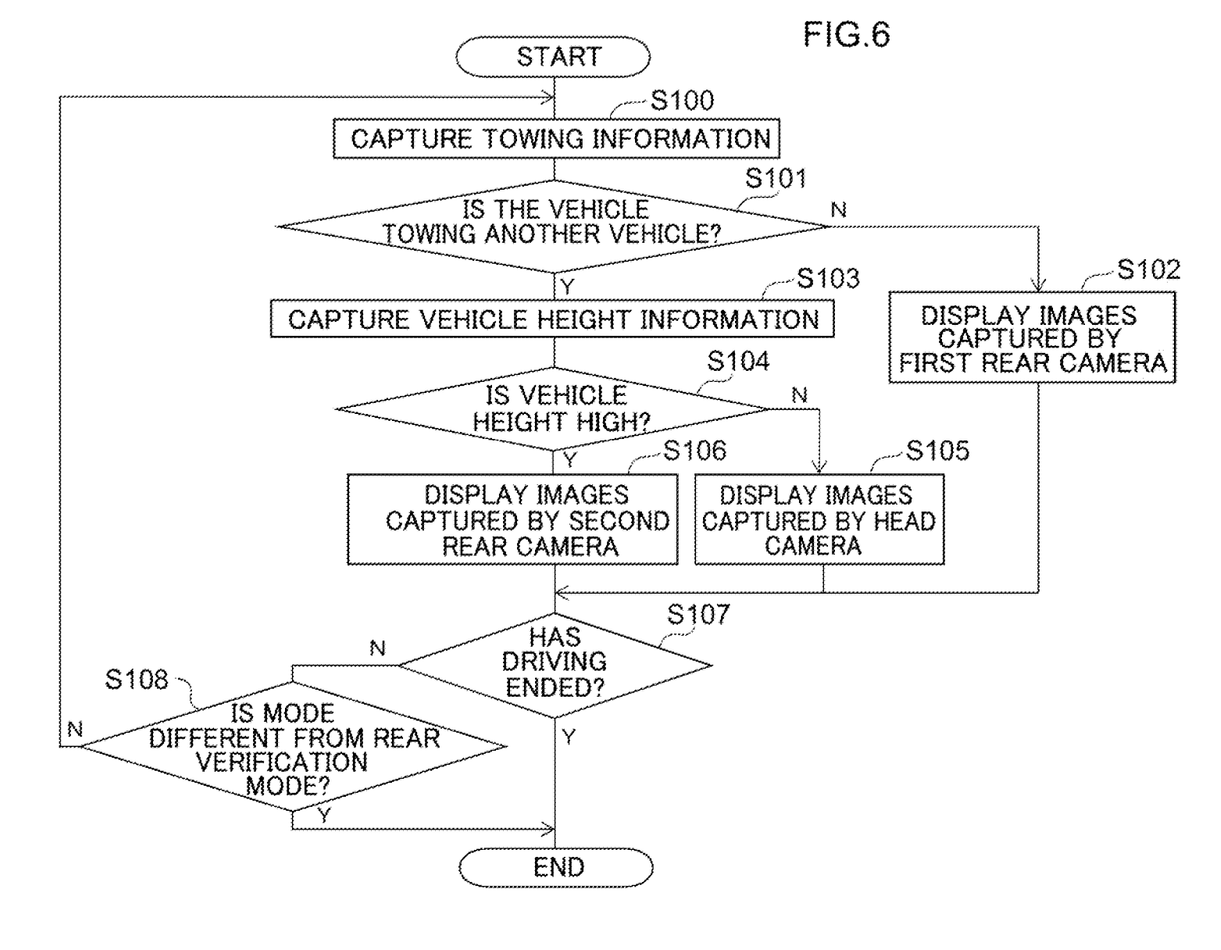
FIG. 6 is a flowchart showing an example of a flow of image display control processing performed by the camera ECU of the monitoring device for a vehicle.

An example of a flow of image display control processing performed by the camera ECU 30 is shown in a flowchart in FIG. 6. The image display control processing performed by the camera ECU 30 is achieved as a result of the CPU 30A reading the image display control program stored in the ROM 30B, and then expanding and executing this program in the RAM 30C. As an example, the image display control processing shown in FIG. 6 starts being executed if both an ignition switch of the vehicle 10 is turned ON and a user has performed a touch operation on the display panel 32B so that the display panel 32B is placed in a mode in which it displays images of the area to the rear of the vehicle (hereinafter, referred to as a 'rear verification mode').

The CPU 30A acquires information relating to whether or not the vehicle 10 is towing another vehicle 50 from the towing information capture device 44 (step S100). Next, the CPU 30A determines whether or not the vehicle 10 is towing the other vehicle 50 based on the information acquired from the towing information capture device 44 (step S101).

If it is determined that the vehicle 10 is not towing the other vehicle 50 (i.e., N in step S101), the CPU 30A causes the images captured by the first rear camera 26 to be displayed on the display panel 32B of the center display device 32 (step S102), and the routine moves to step S107 (described below). If, on the other hand, it is determined that the vehicle 10 is towing the other vehicle 50 (i.e., Y in step S101), the CPU 30A acquires the vehicle height information for the other vehicle 50 that is being towed by the vehicle 10 from the vehicle height information capture device 46 (step S103), and the routine moves to step S104.

In step S104, the CPU 30A determines whether or not the vehicle height of the other vehicle 50 is higher than a predetermined reference value based on the information acquired from the vehicle height information capture device 46 (step S104). As an example, this predetermined reference value is taken as the height position of a bottom end of a lens of the head camera 28 that is installed in the vehicle 10.

If it is determined that the vehicle height of the other vehicle 50 is equal to or less than the predetermined reference value (i.e., N in step S104), the CPU 30A causes the images captured by the head camera 28 to be displayed on the display panel 32B of the center display device 32 (step S105), and the routine moves to step S107 (described below). If it is determined that the vehicle height of the other vehicle 50 is higher than the predetermined reference value (i.e., Y in step S104), the CPU 30A causes the images captured by the second rear camera 56 to be displayed on the display panel 32B of the center display device 32 (step S106), and the routine moves to step S107.

In step S107, the CPU 30A determines, based, for example, on whether or not the ignition switch of the vehicle 10 is turned off, whether or not the driving of the vehicle 10 has ended. If it is determined that the driving of the vehicle 10 has ended (i.e., Y in step S107), the CPU 30A ends the image display control processing shown in FIG. 6. If it is determined that the driving of the vehicle 10 has not ended (i.e., N in step S107), the CPU 30A determines whether or not the center display device 32 is in a mode other than the rear verification mode (step S108).

If it is determined that the center display device 32 is in the rear verification mode (i.e., N in step S108), the CPU 30A repeats the processing from step S100. If it is determined that the center display device 32 is in a mode other than the rear verification mode (i.e., Y in step S108), the CPU 30A ends the image display control processing shown in FIG. 6.

In this way, in the image display control processing shown in FIG. 6, in accordance with whether or not the vehicle 10 is towing the other vehicle 50, and if the vehicle 10 is towing the other vehicle 50, then in accordance with the vehicle height of the other vehicle 50 being towed, one of either the first rear camera 26, the head camera 28, or the second rear camera 56 is suitably selected, and images captured by the selected device are displayed on the display panel 32B of the center display device 32 inside the vehicle cabin 12. Consequently, irrespective of whether or not the vehicle 20 is towing the other vehicle 50, and if the vehicle 10 is towing the other vehicle 50, then irrespective of the vehicle height of the other vehicle 50 being towed, useful images of the area to the rear of the vehicle 10 are able to be displayed on the display panel 32B of the center display device 32 inside the vehicle cabin 12.

Figure 7:
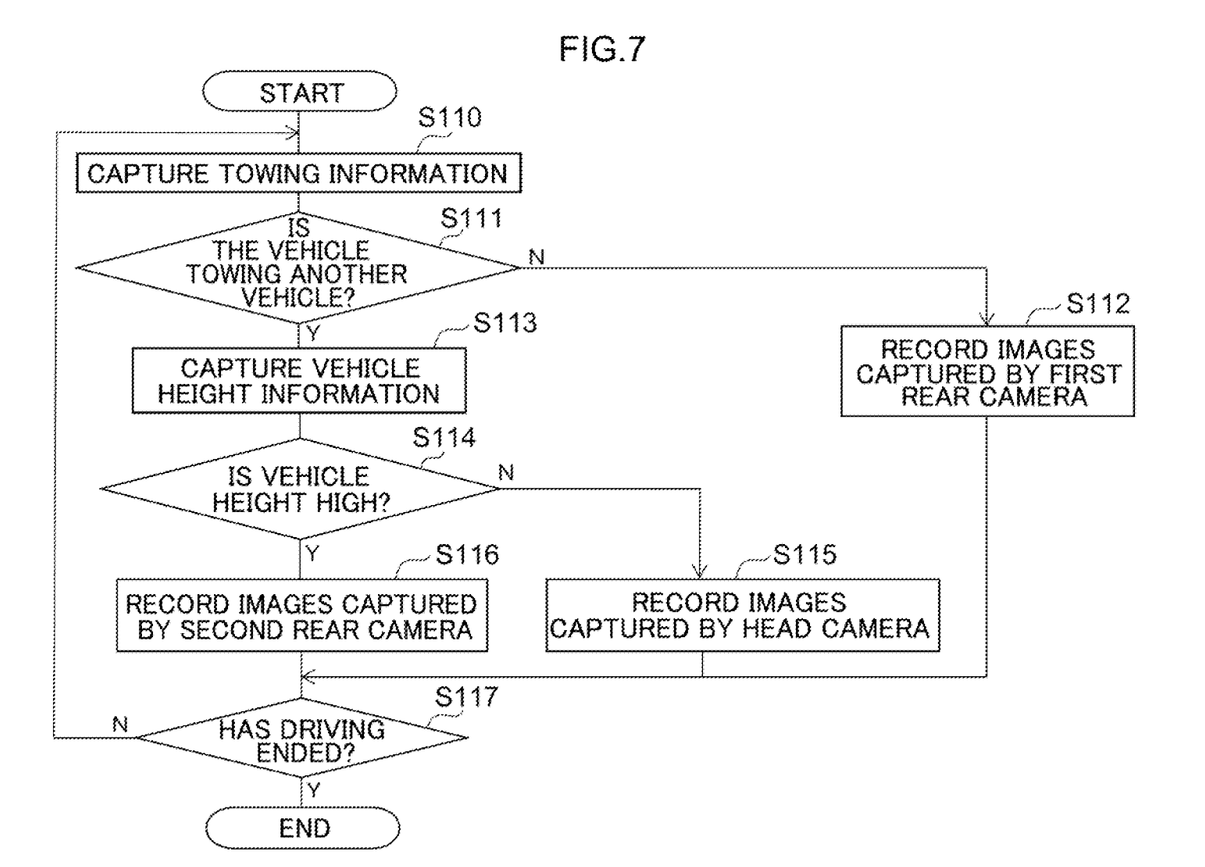
FIG. 7 is a flowchart showing an example of a flow of image recording control processing performed by the camera ECU of the monitoring device for a vehicle.

An example of a flow of image recording control processing performed by the camera ECU 30 is shown in a flowchart in FIG. 7. The image recording control processing performed by the camera ECU 30 is achieved as a result of the CPU 30A reading the image recording control program from the ROM 30B, and then expanding and executing this program in the RAM 30C. The image recording control processing shown in FIG. 7 may start being executed, for example, when the ignition switch of the vehicle 10 is turned on.

The CPU 30A acquires from the towing information capture device 44 information relating to whether or not the vehicle 10 is towing another vehicle 50 (step S110). Next, based on the information acquired from the towing information capture device 44, the CPU 30A determines whether or not the vehicle 10 is towing another vehicle 50 (step S111).

If it is determined that the vehicle 10 is not towing another vehicle 50 (i.e., N in step S111), the CPU 30A causes images captured by the first rear camera 26 to be recorded in the ROM 30B (step S112), and the routine moves to step S117 (described below). If, however, it is determined that the vehicle 10 is towing another vehicle 50 (i.e., Y in step S111), the CPU 30A acquires vehicle height information for the other vehicle 50 that the vehicle 10 is towing from the vehicle height information capture device 46 (step S113), and the routine moves to step S114.

In step S114, based on the information acquired from the vehicle height information capture device 46, the CPU 30A determines whether or not the vehicle height of the other vehicle 50 is higher than a predetermined reference value (step S114). As an example, this predetermined reference value is taken as the height position of a bottom end of a lens of the head camera 28 that is installed in the vehicle 10.

If it is determined that the vehicle height of the other vehicle 50 is equal to or less than the predetermined reference value (i.e., N in step S114), the CPU 30A causes the images captured by the head camera 28 to be recorded in the ROM 30B (step S115), and the routine moves to step S117 (described below). If it is determined that the vehicle height of the other vehicle 50 is higher than the predetermined reference value (i.e., Y in step S114), the CPU 30A causes the images captured by the second rear camera 56 to be recorded in the ROM 30B (step S116), and the routine moves to step S117.

In step S117, the CPU 30A determines, based, for example, on whether or not the ignition switch of the vehicle 10 is turned off, whether or not the driving of the vehicle 10 has ended. If, however, it is determined that the driving of the vehicle 10 has not ended (i.e., N in step S117), the CPU 30A repeats the processing from step S110. If it is determined that the driving of the vehicle 10 has ended (i.e., Y in step S117), the CPU 30A ends the image recording control processing shown in FIG. 7.

In this way, in the image recording control processing shown in FIG. 7, in accordance with whether or not the vehicle 10 is towing the other vehicle 50, and if the vehicle 10 is towing the other vehicle 50, then in accordance with the vehicle height of the other vehicle 50 being towed, one of either the first rear camera 26, the head camera 28, or the second rear camera 56 is suitably selected, and images captured by the selected device are recorded in the ROM 30B. Consequently, irrespective of whether or not the vehicle 20 is towing the other vehicle 50, and if the vehicle 10 is towing the other vehicle 50, then irrespective of the vehicle height of the other vehicle 50 being towed, useful images of the area to the rear of the vehicle 10 are able to be recorded in the ROM 30B.

As has been described above, according to the monitoring device for a vehicle 20 of the present exemplary embodiment, it is possible to provide rear monitoring support in accordance with whether or not towing is being performed.

Note that, as a variant example of the above-described exemplary embodiment, it is also possible to omit step S107 and step S108 of FIG. 6, and to instead continue the processing of the relevant steps until either 'it is determined that the driving of the vehicle 10 has ended', or 'it is determined that the center display device 32 is in a mode other than the rear verification mode' in step S102, step S105, and step S106.

Moreover, as a variant example of the above-described exemplary embodiment, it is also possible to omit step S117, and to instead continue the processing of the relevant steps until 'it is determined that the driving of the vehicle 10 has ended' in step S112, step S115, and step S116.

Moreover, in the above-described exemplary embodiment, the image display control program and the image recording program are stored in the ROM 30B shown in FIG. 4, however, as a variant example of the above-described exemplary embodiment, it is also possible for either one of, or both of the image display control program and the image recording program to be stored in the storage 30D instead of the ROM 30B.

Moreover, in the above-described exemplary embodiment, images of the area to the rear of the vehicle 10 are recorded in the ROM 30B, however, as a variant example of the above-described exemplary embodiment, it is also possible to employ a structure in which images of the area to the rear of the vehicle 10 are recorded in the storage 30D instead of the ROM 30B.

Moreover, in the above-described exemplary embodiment, the camera ECU 30 has both the display controller 301 and the recording controller 302 shown in FIG. 5 as function structures, however, as a variant example of the above-described exemplary embodiment, it is also possible to employ a structure in which the camera ECU (30) only has one of the display controller (301) or the recording controller (302) as function structures.

Moreover, in the above-described embodiment, both the head camera 28 and the second rear camera 56 are provided as second capture devices, and this type of structure is to be preferred. However, it is also possible to employ a structure in which only one of the head camera (28) or the second rear camera (56) is provided as the second capture device. In the case of a variant example of this type, the vehicle height information capture device 46 can be omitted so that the monitoring support unit (34) does not perform processing relating to the vehicle height of the other vehicle (50).

Note that in the above-described exemplary embodiment, it is also possible for the various types of processing executed by the CPU 30A shown in FIG. 4 after reading software (i.e., a program) to instead be executed by various types of processors other than a CPU. Examples of other types of processors in this case include PLD (Programmable Logic Devices) whose circuit structure can be altered after manufacturing such as an FPGA (Field-Programmable Gate Array), and dedicated electrical circuits and the like which are processors having a circuit structure that is designed specifically in order to execute a particular processing such as ASIC (Application Specific Integrated Circuits). In addition, the various processings may be executed by just one type from among these various types of processors, or by a combination of two or more processors that are either the same type or are mutually different types (for example by a plurality of FPGA or by a combination of a CPU and an FPGA). Furthermore, the hardware structures of these different types of processors are, more specifically, electrical circuits obtained by combining circuit elements such as semiconductor elements and the like.

Moreover, in the above-described exemplary embodiment, each of the programs described may also be provided in a format in which it is recorded on a recording medium such as a CD-ROM (Compact Disc Read Only Memory), a DVD-ROM (Digital Versatile Disc Read Only Memory), or a USB (Universal Serial Bus) memory. Moreover, it is also possible to enable each program to be downloaded from an external device via a network.

Additionally, in the above-described exemplary embodiment, the vehicle 10 shown in FIG. 1 and the like is a vehicle that is provided, as an example, with the cargo tray 14 at the rear of the vehicle cabin 12, however, the vehicle to which the present disclosure is applied may be a different type of vehicle provided that it is capable of towing another vehicle.

Note also that the above-described exemplary embodiments and variant examples thereof may also be combined into various suitable forms, and then applied.

An exemplary embodiment of the present disclosure has been described above, however, the present disclosure is not limited to this. Various modifications and the like may be made to the present disclosure insofar as they do not depart from the spirit or scope of the present disclosure.

An object of the present disclosure is to provide a monitoring device for a vehicle that enables rear monitoring support to be provided in accordance with whether or not towing is being performed.

A first aspect of the present disclosure is a monitoring device for a vehicle that includes: a first capture device being installed in a rear end portion of a vehicle and capturing images of an area to a rear of the vehicle; a second capture device being installed in at least one of the vehicle or another vehicle in a case in which the vehicle is towing another vehicle, and that, in a case in which the vehicle is towing another vehicle, capturing images over a wider range of the area to the rear of the vehicle than does the first capture device; a towing information capture device capturing information relating to whether or not the vehicle is towing another vehicle; and a processor being configured to, in a case in which it is determined, based on the information captured by the towing information capture device, that the vehicle is not towing another vehicle, provide support for monitoring the area to the rear of the vehicle using images captured by the first capture device, and in a case in which it is determined, based on the information captured by the towing information capture device, that the vehicle is towing another vehicle, provide support for monitoring the area to the rear of the vehicle using images captured by the second capture device. The first capture device includes devices that, in a case in which a vehicle is towing another vehicle, are not able to capture an image of the rear of that other vehicle (i.e., when the image capture range to the rear of the other vehicle is 0).

According to the above-described structure, a first capture device that is installed in a rear end portion of a vehicle captures images of an area to the rear of a vehicle. In addition, a second capture device is installed in at least one of the vehicle or another vehicle in a case in which the vehicle is towing the other vehicle. In a case in which the vehicle is towing the other vehicle, then the second capture device captures images over a wider range of the area to the rear of the vehicle than does the first capture device. Information relating to whether or not the vehicle is towing another vehicle is captured by a towing information capture device. In a case in which it is determined, based on the information captured by the towing information capture device, that the vehicle is not towing another vehicle, a processor provides support for monitoring the area to the rear of the vehicle using images captured by the first capture device. If, however, it is determined, based on the information captured by the towing information capture device, that the vehicle is towing another vehicle, the processor provides support for monitoring the area to the rear of the vehicle using images captured by the second capture device. By employing this structure, it is possible to provide rear monitoring support in accordance with whether or not a vehicle is towing another vehicle.

A second aspect of the present disclosure is the monitoring device for a vehicle of the first aspect, that further includes: a presenter being provided in a vehicle cabin of the vehicle and displays images, wherein, the processor is configured to, in a case in which it is determined, based on the information captured by the towing information capture device, that the vehicle is not towing another vehicle, cause images captured by the first capture device to be displayed on the presenter, and in a case in which it is determined, based on the information captured by the towing information capture device, that the vehicle is towing another vehicle, cause images captured by the second capture device to be displayed on the presenter.

According to the above-described structure, the monitoring device for a vehicle includes a presenter that is provided in a vehicle cabin of the vehicle. In a case in which it is determined, based on the information captured by the towing information capture device, that the vehicle is not towing another vehicle, the processor causes images captured by the first capture device to be displayed on the presenter. On the other hand, in a case in which it is determined, based on the information captured by the towing information capture device, that the vehicle is towing another vehicle, the processor causes images captured by the second capture device to be displayed on the presenter. By employing this structure, it is possible to provide rear monitoring support by displaying images in accordance with whether or not a vehicle is towing another vehicle.

A third aspect of the present disclosure is the monitoring device for a vehicle of the first of second aspect, that further includes: a memory recording images, wherein, the processor is configured to: in a case in which it is determined, based on the information captured by the towing information capture device, that the vehicle is not towing another vehicle, cause images captured by the first capture device to be recorded in the memory, and in a case in which it is determined, based on the information captured by the towing information capture device, that the vehicle is towing another vehicle, cause images captured by the second capture device to be recorded in the memory.

In a case in which it is determined, based on the information captured by the towing information capture device, that the vehicle is not towing another vehicle, the processor causes images captured by the first capture device to be recorded in memory, and in a case in which it is determined, based on the information captured by the towing information capture device, that the vehicle is towing another vehicle, the processor causes images captured by the second capture device to be recorded in the memory. By employing this structure, it is possible to provide rear monitoring support by recording images in accordance with whether or not a vehicle is towing another vehicle.

A fourth aspect of the present disclosure is the monitoring device for a vehicle of any one of the first through third aspects, wherein there are provided a plurality of the second capture devices, and the monitoring device for a vehicle further comprises a vehicle height information capture device that, in a case in which the vehicle is towing another vehicle, captures vehicle height information for the other vehicle, and the processor is configured to provide support for monitoring the area to the rear of the vehicle by selecting any one of the plurality of second capture devices in accordance with the vehicle height information for the other vehicle captured by the vehicle height information capture device, and then using the images captured by the selected second capture device.

According to the above-described structure, there are provided a plurality of the second capture devices, and in a case in which the vehicle is towing another vehicle, vehicle height information for the other vehicle is captured by a vehicle height information capture device. The processor provides support for monitoring the rear of the vehicle by selecting any one of the plurality of second capture devices in accordance with the vehicle height information for the other vehicle captured by the vehicle height information capture device, and then using the images captured by the selected second capture device. By employing this structure, it is possible to use the most preferable images in accordance with the vehicle height of the other vehicle that is being towed by the vehicle.

A fifth aspect of the present disclosure is the monitoring device for a vehicle of any one of the first through fourth aspects, wherein, in a case in which both the vehicle is towing another vehicle, and a rear portion camera that captures images of an area to the rear of the other vehicle is installed in a rear end portion of the other vehicle, the second capture devices include the rear portion camera.

According to the above-described structure, even in a case in which the vehicle is towing another vehicle, images of an area to the rear of the other vehicle can be captured by a rear portion camera that is installed in a rear end portion of the other vehicle.

A Sixth aspect of the present disclosure is the monitoring device for a vehicle according to any one of the first through fifth aspects, wherein the vehicle is provided with a cargo tray on a rear side of the vehicle cabin, and the second capture devices include an upper portion camera that is installed in an upper portion of the vehicle on the rear end portion side of the vehicle cabin, and that captures images of the cargo tray and of the area to the rear of the vehicle.

According to the above-described structure, an upper portion camera is installed as a second capture device in an upper portion of the vehicle on the rear end portion side of the vehicle cabin, and this upper portion camera captures images of a cargo tray and of the area to the rear of the vehicle. By employing this structure, in a case in which a vehicle is towing another vehicle, images of an area to the rear of the vehicle can be captured by the upper portion camera.

The present disclosure can be realized in a form of a monitoring method for a vehicle. According to the monitoring device for a vehicle and the monitoring method for a vehicle of the present disclosure, it is possible to provide rear monitoring support in accordance with whether or not towing is being performed.

What is claimed is:

1. A monitoring device for a vehicle comprising:
    a first capture device being installed in a rear end portion of a vehicle and capturing images of an area to a rear of the vehicle;
    a second capture device being installed in at least one of the vehicle or another vehicle in a case in which the vehicle is towing another vehicle, and that, in a case in which the vehicle is towing another vehicle, capturing images over a wider range of the area to the rear of the vehicle than does the first capture device;
    a towing information capture device capturing information relating to whether or not the vehicle is towing another vehicle; and
    a processor being configured to, in a case in which it is determined, based on the information captured by the towing information capture device, that the vehicle is not towing another vehicle, provide support for monitoring the area to the rear of the vehicle using images captured by the first capture device, and in a case in which it is determined, based on the information captured by the towing information capture device, that the vehicle is towing another vehicle, provide support for monitoring the area to the rear of the vehicle using images captured by the second capture device.

2. The monitoring device for a vehicle according to claim 1, further comprising:
    a presenter being provided in a vehicle cabin of the vehicle and displays images, wherein,
    the processor is configured to, in a case in which it is determined, based on the information captured by the towing information capture device, that the vehicle is not towing another vehicle, cause images captured by the first capture device to be displayed on the presenter, and in a case in which it is determined, based on the information captured by the towing information capture device, that the vehicle is towing another vehicle, cause images captured by the second capture device to be displayed on the presenter.

3. The monitoring device for a vehicle according to claim 1, further comprising:
a memory recording images, wherein,
the processor is configured to: in a case in which it is determined, based on the information captured by the towing information capture device, that the vehicle is not towing another vehicle, cause images captured by the first capture device to be recorded in the memory, and in a case in which it is determined, based on the information captured by the towing information capture device, that the vehicle is towing another vehicle, cause images captured by the second capture device to be recorded in the memory.

4. The monitoring device for a vehicle according to claim 1, wherein there are provided a plurality of the second capture devices, and
the monitoring device for a vehicle further comprises a vehicle height information capture device that, in a case in which the vehicle is towing another vehicle, captures vehicle height information for the other vehicle, and
the processor is configured to provide support for monitoring the area to the rear of the vehicle by selecting any one of the plurality of second capture devices in accordance with the vehicle height information for the other vehicle captured by the vehicle height information capture device, and then using the images captured by the selected second capture device.

5. The monitoring device for a vehicle according to claim 1, wherein, in a case in which both the vehicle is towing another vehicle, and a rear portion camera that captures images of an area to the rear of the other vehicle is installed in a rear end portion of the other vehicle, the second capture devices include the rear portion camera.

6. The monitoring device for a vehicle according to claim 1, wherein the vehicle is provided with a cargo tray on a rear side of the vehicle cabin, and
the second capture devices include an upper portion camera that is installed in an upper portion of the vehicle on the rear end portion side of the vehicle cabin, and that captures images of the cargo tray and of the area to the rear of the vehicle.

7. A monitoring method for a vehicle, in which:
images of an area to a rear of a vehicle are captured by a first capture device that is installed in a rear end portion of the vehicle,
in a case in which the vehicle is towing another vehicle, images are captured by a second capture device that is installed in at least one of the vehicle, or the other vehicle in a case in which the vehicle is towing another vehicle, over a wider range of the area to the rear of the vehicle than are captured by the first capture device, and
information relating to whether or not the vehicle is towing another vehicle is captured by a towing information capture device, and the monitoring method comprising:

by a processor, in a case in which it is determined, based on the information captured by the towing information capture device, that the vehicle is not towing another vehicle, supporting for monitoring the area to the rear of the vehicle is provided using images captured by the first capture device, and in a case in which it is determined, based on the information captured by the towing information capture device, that the vehicle is towing another vehicle, supporting for monitoring the area to the rear of the vehicle is provided using images captured by the second capture device.

8. The monitoring method for a vehicle according to claim 7, wherein,
by the processor,
in a case in which it is determined, based on the information captured by the towing information capture device, that the vehicle is not towing another vehicle, on a presenter provided inside the vehicle cabin of the vehicle, images captured by the first capture device is displayed, and in a case in which it is determined, based on the information captured by the towing information capture device, that the vehicle is towing another vehicle, on the presenter, images captured by the second capture device is displayed.

9. The monitoring method for a vehicle according to claim 7, wherein,
by the processor,
in a case in which it is determined, based on the information captured by the towing information capture device, that the vehicle is not towing another vehicle, images captured by the first capture device are recorded in a memory in which images are recorded, and in a case in which it is determined, based on the information captured by the towing information capture device, that the vehicle is towing another vehicle, images captured by the second capture device are recorded in the memory.

10. The monitoring method for a vehicle according to claim 7, wherein,
there are provided a plurality of the second capture devices, and,
in a case in which the vehicle is towing another vehicle, vehicle height information for the other vehicle is captured by a vehicle height information capture device, and
by the processor,
support for monitoring the area to the rear of the vehicle is provided as a result of any one of the plurality of second capture devices being selected in accordance with the vehicle height information for the other vehicle captured by the vehicle height information capture device, and then the images captured by the selected second capture device being used.

* * * * *